Aug. 24, 1965 D. H. BOCK 3,202,981

ANALOGUE-TO-BINARY CODE CONVERTER

Filed Feb. 16, 1960

4 Sheets-Sheet 1

INVENTOR
DITMAR H. BOCK

BY

ATTORNEYS

Aug. 24, 1965 D. H. BOCK 3,202,981

ANALOGUE-TO-BINARY CODE CONVERTER

Filed Feb. 16, 1960

4 Sheets-Sheet 2

INVENTOR

DITMAR H. BOCK

BY

[signature]

[signature]

ATTORNEYS

INVENTOR
DITMAR H. BOCK

[signature]
[signature]
ATTORNEYS

Aug. 24, 1965 D. H. BOCK 3,202,981

ANALOGUE-TO-BINARY CODE CONVERTER

Filed Feb. 16, 1960 4 Sheets-Sheet 4

INVENTOR
DITMAR H. BOCK

BY

ATTORNEY 3,202,981
ANALOGUE-TO-BINARY CODE CONVERTER

Ditmar H. Bock, Buffalo, N.Y., assignor, by mesne assignments, to the United States of America as represented by the Secretary of the Navy Filed Feb. 16, 1960, Ser. No. 9,142
8 Claims. (Cl. 340—347)

This invention relates to an analogue-to-binary code converter for converting an analogue voltage or other varying signal to a binary code output which is suitable for use by most digital computers.

In the past in order to convert from an analogue voltage to units which were suitable for use by digital computers, mechanical converters, which had a large number of moving parts that generated noise and transients, have been used. The most serious limitation of these prior devices was the relatively low speed at which they were able to make a complete conversion from an analogue voltage to a digital count.

The primary object of this invention therefore is to provide an analogue-to-binary code converter which uses no moving parts and which may operate at speeds up to and beyond 100,000 conversions per second.

Another object of this invention is to provide an analogue-to-binary code converter which eliminates transient noise and switching chatter.

Other objects and many of the attendant advantages of this invention will be readily appreciated as the same becomes better understood by reference to the following detailed description when considered in connection with the accompanying drawings wherein.

Figure 1:
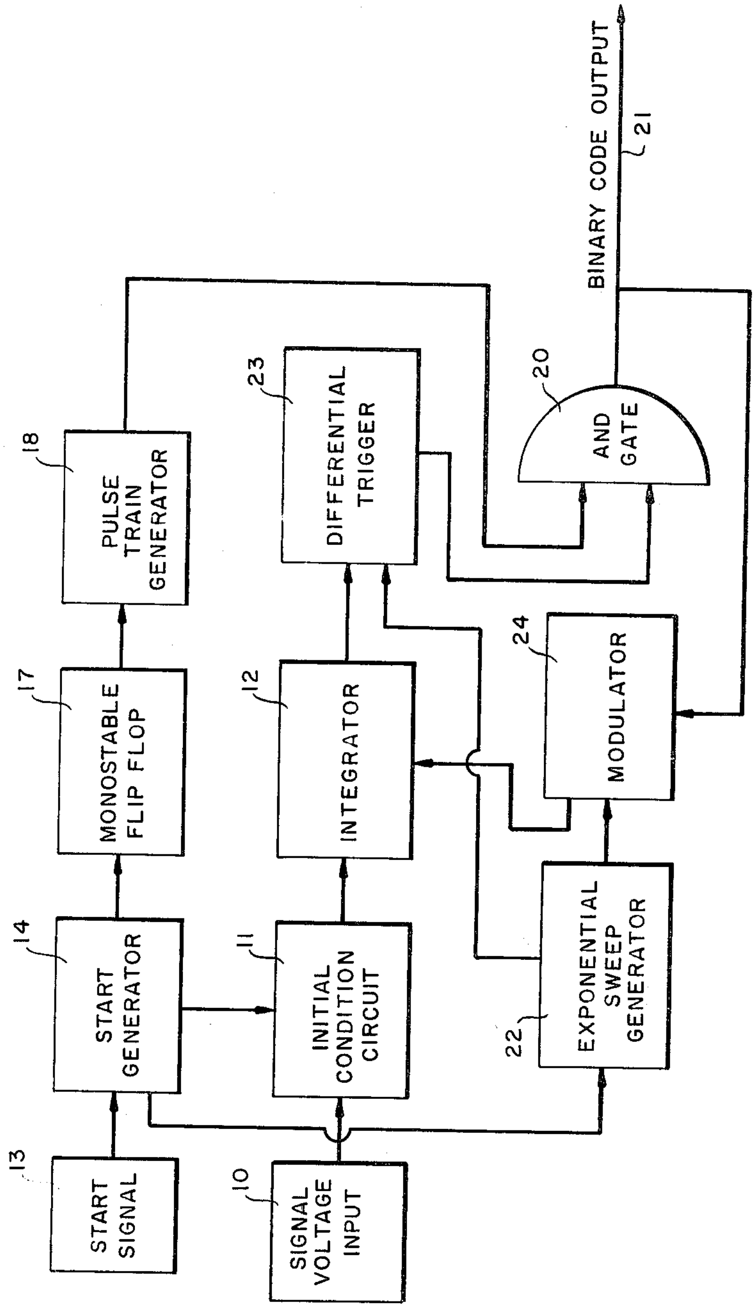
FIG. 1 is a block diagram of the analogue-to-binary code converter.
Figure 3:
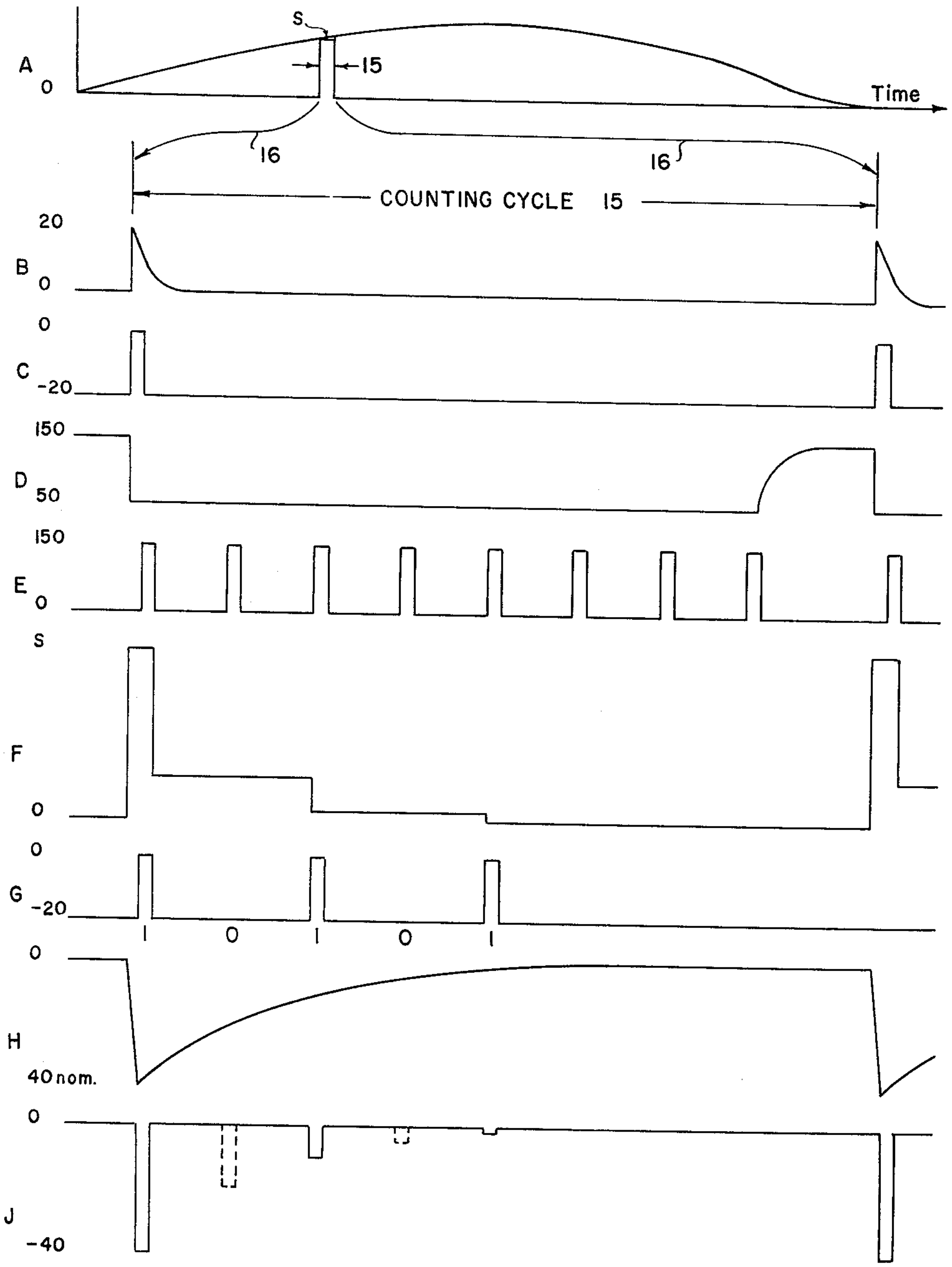
FIG. 3 is a group of drawings illustrating the wave forms of the analogue-to-binary converter.

Referring to FIGS. 1 and 3 a signal voltage input 10, as is illustrated by curve A on FIG. 3, may be an analogue voltage which varies either slowly or rapidly with respect to time. This varying analogue voltage is passed through an initial condition circuit 11 to an integrator 12, which integrator will follow the analogue voltage input 10.

If a conversion of this voltage to an output having a binary count is desired, a start signal 13 energizes a start generator 14 to initiate a count cycle which is indicated by a short pulse 15 on FIG. 3A. Counting cycle 15 may be very short and, in order to eliminate quantizing noise, is appreciably shorter than the inverse of the highest frequency component that the signal voltage input 10 will have in any particular application. Since counting cycle 15 is short relative to the variation of the signal input, arrows 16 on FIG. 3A indicate that the time scale of the various wave forms in the converter (FIGS. 3B–J) have been expanded in order to more clearly show the converter mode of operation.

A differentiated start signal as shown in FIG. 3B triggers start generator 14 to deliver a one microsecond rectangular output pulse as shown by FIG. 3C to trigger monostable flip-flop 17. Monostable flip-flop 17 has a long output pulse, FIG. 3D, which is slightly shorter than the counting cycle time 15 and which energizes pulse train generator 18. Pulse train generator 18 generates a series of pulses as shown at FIG. 3E which are fed to the and gate 20 and which may appear as a binary code output 21, FIG. 3G.

Start generator 14 also triggers an exponential sweep generator 22 which has a sweep output voltage, FIG. 3H, that has a half life or half amplitude decay time equal to the spacing between the pulses from pulse train generator 18, FIG. 3E.

Sweep generator 22 is connected to a differential trigger 23 and has a dual input there with the output of integrator 12. In order to achieve a binary output, differential trigger 23 operates and opens And gate 20 when the amplitude of the sweep voltage, FIG. 3H, is equal to or less than the voltage on integrator 12.

Every time that the exponential sweep voltage FIG. 3H is equal to or less than the integrator 12 voltage, the sweep generator 22 output, FIG. 3H, and the binary code output 21, FIG. 3G, are fed to a modulator 24 where they are mixed to produce the series of impulses as shown in FIG. 3J which have an amplitude which is in a decreasing binary series and which is the same as the amplitude of the sweep voltage FIG. 3H. This series of impulses, FIG. 3J, is fed from modulator 24 to the integrator 12 where it reduces the voltage on the integrator 12 by an amount equal to the sweep voltage to successively reduce the voltage on the integrator 12 to zero, as indicated by the waveform shown in FIG. 3F. The coupling of the modulator to receive the discrete output code pulses of the And-gate 20 eliminates the need of a limiter and amplifier in the production of pulses to be fed to the integrator 12.

This reduction of the voltage on the integrator 12 occurs during a counting cycle so that the integrator is then discharged and is ready to be charged again up to the signal voltage input to await another count. For example curve G shows a count of 1–0–1–0–1 which is suitable for use in most digital computers without further modification or conversion. To prevent integrator 12 from recharging during counting cycle 15, the initial condition circuit disconnects signal voltage input 10 from integrator 12. This counting operation may be initiated at any time by a start signal or may be a repetitive operation.

Figure 2A:
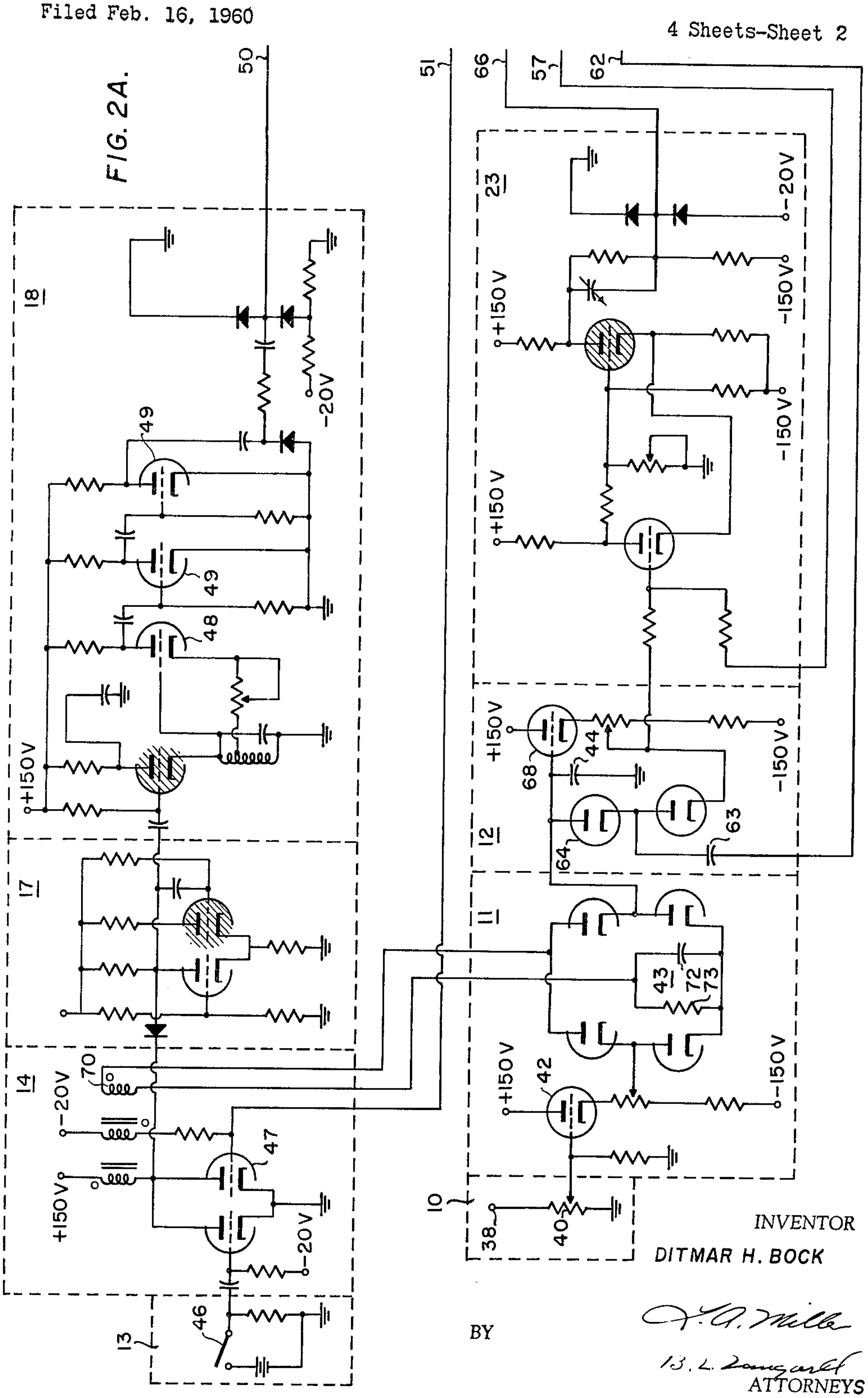
FIGS. 2A and 2B are schematic diagrams of a preferred embodiment of the analogue-to-binary converter.
Figure 2B:
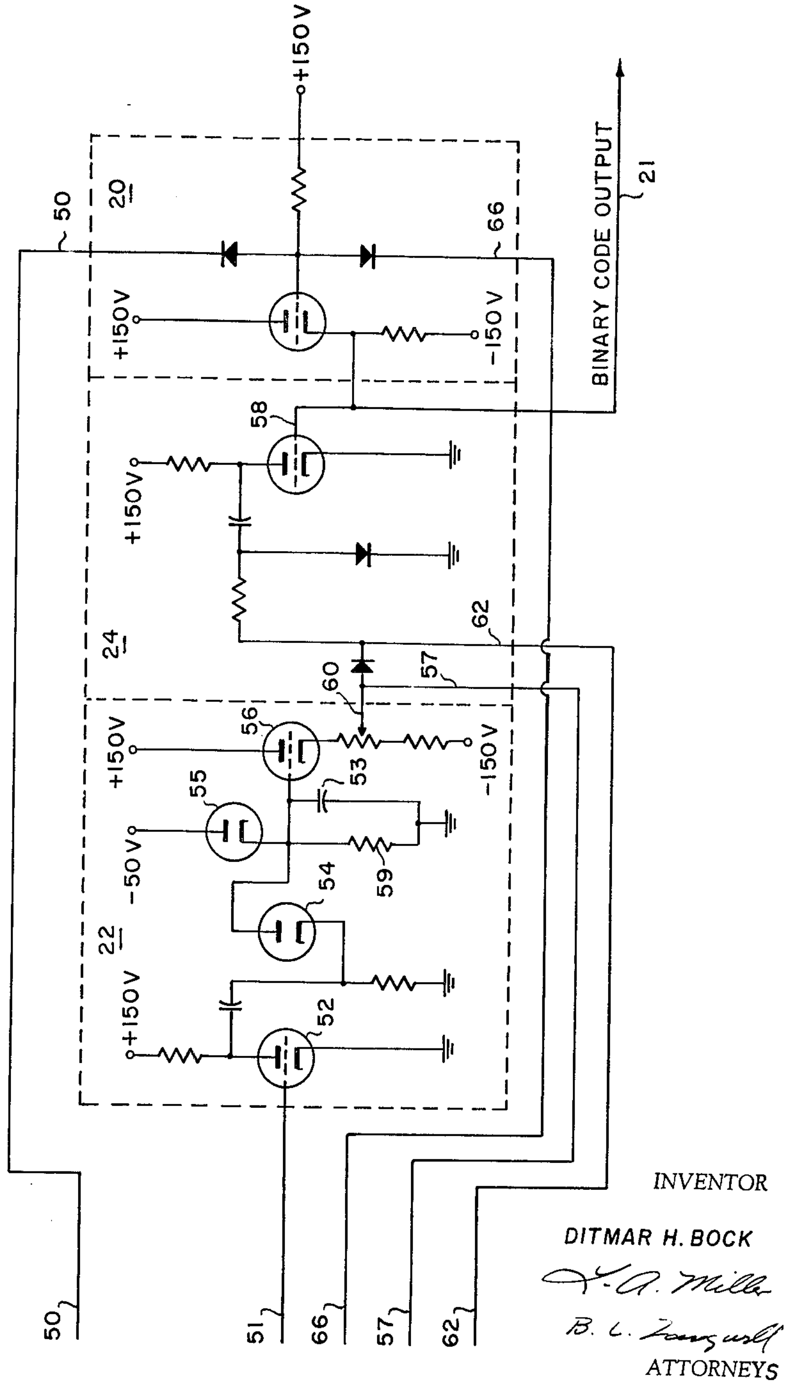

Referring now to FIGS. 2A and 2B, which show a preferred embodiment of the invention, a signal voltage may be fed to an input terminal 38 and varied by a potentiometer 40 since the maximum voltage input 10 to the integrator 12 must be less than twice the maximum sweep voltage. The signal is passed through a cathode follower tube 42 and diode bridge 43 to an integrator capacitor 44.

A start signal 13, which may be from an asynchronous switch 46 or may be a synchronous type, triggers a blocking oscillator tube 47 to produce several outputs. Monostable flip-flop 17 is triggered from the plate of blocking oscillator 47 to generate a long output pulse, shown in FIG. 3D, which turns on a pulsed Hartley oscillator tube 48. Amplifiers 49 in pulse generator 18 differentiate and amplify tube 48 output so that the positive pulses in FIG. 3E are connected to And gate 20 by line 50.

The positive pulse, FIG. 3C, on the grid of blocking oscillator tube 47 is connected by a line 51 to an amplifier tube 52 in the exponential sweep generator 22 where it is inverted to charge a sweep capacitor 53 to the sweep voltage, FIG. 3H, through a diode 54 to a nominal minus 40 volts. A diode clamp 55 limits the range of capacitor 53 to a nominal —50 volts.

Sweep capacitor 53 discharges through resistor 59 to provide a sweep voltage with a half amplitude decay time equal to the oscillation period of Hartley oscillator tube 48 in pulse train generator 18. Cathode follower tube 56 connects the sweep voltage, FIG. 3H, by line 57 to differential trigger 23 and to modulator 24 by line 60.

When the amplitude of the sweep voltage FIG. 3H is equal to or less than the voltage on integrator capacitor 44, pulses FIG. 3G are passed through And gate 20 to a binary code output 21 and to modulator 24 by a line 58 so that the decreasing binary series of impulses FIG. 3J are generated and connected by a line 62 through a capacitor 63 and a diode 64 to discharge integrator capacitor 44 as shown by FIG. 3F.

Whenever the voltage as shown by FIG. 3F on integrator capacitor 44 is equal to or larger than the voltage on sweep capacitor 53, the Schmitt trigger circuit in differential trigger 23 is operated and sends a gating pulse by line 66 to open the And gate 20 and produce the binary code output 21 as shown by FIG. 3G.

During counting cycle 15, winding 70 on the blocking oscillator transformer in start generator 14 charges capacitor 72 in diode bridge 43 to reverse bias each diode in the bridge and prevent conduction from the signal voltage input to integrator capacitor 44. Capacitor 72 discharges through resistor 73 during counting cycle 15 so that integrator capacitor 44 may be recharged to the signal voltage to await another counting cycle.

As is apparent to one skilled in the art, the Schmitt trigger circuit in differential trigger 23 may be some limitation at high speeds, but this may easily be improved by using high current pentodes and additional positive feedback as is well known in the art.

The circuit as thus described may need a counting cycle 15 of only ten to twenty microseconds to allow a conversion rate of 50,000 to 100,000 per second. High current, high speed circuits with solid state diodes or transistors can easily improve this figure if desired.

Obviously many modifications and variations of the present invention are possible in the light of the above teachings. It is therefore to be understood that within the scope of the appended claims the invention may be practiced otherwise than as specifically described.

What is claimed is:

1. An analogue to binary code converter having a signal voltage input and a binary code output comprising an integrator for storing said signal voltage, a start generator for initiating a counting cycle having a relatively short time as compared with the inverse of the highest frequency component of said signal voltage whereby quantizing noise may be minimized, a pulse train generator connected to said start generator for generating a series of pulses during said cycle, an exponential sweep generator connected to said start generator for generating an exponential sweep voltage, a differential trigger connected to said integrator and sweep generator for generating an output when the amplitude of said sweep voltage is equal to or less than said stored signal voltage, an And gate connected to said pulse train generator and differential trigger for passing a binary code output having a digital count proportional to the amplitude of said signal voltage input, and a modulator connected to said binary code output and exponential sweep generator for reducing the signal voltage on said integrator by a predetermined amount whenever said gate passes an output pulse.

2. An analogue to binary code converter according to claim 1 and further characterized by an initial condition circuit connected between said signal voltage input and said integrator for passing said signal voltage to said integrator except during a counting cycle.

3. An analogue to binary code converter according to claim 2 and further characterized by means connecting said start generator and initial condition circuit for blocking the connection between said input and integrator during a counting cycle.

4. An analogue to binary code converter according to claim 2 and further characterized by said blocking means additionally comprising a diode bridge and voltage storage means for reverse biasing said diodes.

5. An analogue to binary code converter according to claim 1 and further characterized by said modulator additionally comprising a diode gate for mixing said exponential sweep and said binary code output to produce a binary series of impulses having a count proportional to said signal voltage and having a steadily decaying amplitude arranged in a binary series.

6. An analogue to binary code converter according to claim 5 and further characterized by said exponential sweep having a half amplitude decay time equal to the time between pulses of said series of pulses.

7. An analogue to binary code converter according to claim 1 and further characterized by a monostable flip-flop connected between said start generator and pulse train generator for turning on said pulse train generator for a period slightly less than said counting cycle.

8. Apparatus for converting an analogue input signal into a binary code output signal comprising a source of periodic clock pulses, pulse train generating means connected to said source for producing a train of pulses between said clock pulses, an exponential waveform generator connected to said source for producing a voltage waveform whose amplitude decreases one-half with each successive pulse of said pulse train, an integrator for storing the input signal voltage for discharge in stepwave form, trigger means coupled to said integrator and to said exponential waveform generator for producing output voltages whenever the output voltage of said waveform generator is equal to or less than the output voltage of said integrator, said output voltages thereby occurring at times corresponding to a binary representation of the portion of the input signal integrated, gating means for producing output pulses only when the output pulses of said trigger means and of said pulse train generator are substantially in coincidence to thereby produce a binary coded pulse train, and modulator means for modulating pulses passed by said gating means with the output of said exponential waveform generator to provide said integrator with pulses of steadily decaying amplitude to reduce the stored signal voltage on said integrator by a predetermined amount of the times when the gating pulses are passed.

References Cited by the Examiner

UNITED STATES PATENTS

| | | | |
|---|---|---|---|
| 2,754,503 | 7/56 | Forbes | 340—347 |
| 2,784,396 | 3/57 | Kaiser et al. | 340—347 |
| 2,872,670 | 2/59 | Dickinson | 340—347 |
| 2,941,196 | 6/60 | Raynsford et al. | 340—347 |
| 2,957,943 | 10/60 | Rack | 340—347 |

MALCOLM A. MORRISON, *Primary Examiner.*

IRVING L. SRAGOW, JOHN F. BURNS, *Examiners.*